United States Patent
Busso et al.

(10) Patent No.: US 6,625,456 B1
(45) Date of Patent: Sep. 23, 2003

(54) MOBILE COMMUNICATION SYSTEM ENABLING LOCATION ASSOCIATED MESSAGES

(75) Inventors: Roberto Busso, Göteborg (SE); Bo Gustaf Granstam, Kållered (SE); Mattias Leijon, Göteborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 467 days.

(21) Appl. No.: 09/658,609

(22) Filed: Sep. 8, 2000

(30) Foreign Application Priority Data

Sep. 10, 1999 (SE) .............................................. 9903237

(51) Int. Cl.7 ................................................ H04Q 7/20
(52) U.S. Cl. ...................... 455/456; 455/412; 455/466
(58) Field of Search ................................. 455/422, 456, 455/403, 412, 433, 435, 517, 414, 466

(56) References Cited

U.S. PATENT DOCUMENTS

| | | | | |
|---|---|---|---|---|
| 5,579,535 A | * | 11/1996 | Orlen et al. | ................. 455/421 |
| 6,091,956 A | * | 7/2000 | Hollenberg | ................. 455/456 |
| 6,108,533 A | * | 8/2000 | Brohoff | ..................... 455/414 |
| 6,208,866 B1 | * | 3/2001 | Rouhollahzadeh et al. | . 455/456 |
| 6,505,046 B1 | * | 1/2003 | Baker | ........................ 455/456 |

\* cited by examiner

*Primary Examiner*—Nguyen T. Vo
*Assistant Examiner*—Simon Nguyen

(57) ABSTRACT

Mobile communication system (MS) comprising a plurality of mobile terminals (MT), being adapted for communicating with a dedicated server (DS) has been described. The mobile communication system comprises position means (PSS) for locating the geographical position of individual mobile terminals. The dedicated server is being adapted to store message data on-line in an information database (IDB) and link such message data to a first set of locations, the dedicated server is furthermore being adapted to engage in on-line search sessions with individual searching mobile terminals for forwarding stored message data to such searching mobile terminals upon request and in accordance with a user specified search profile involving a particular set of locations associated with the message and/or with an enquiring mobile.

10 Claims, 2 Drawing Sheets

MOBILE COMMUNICATION SYSTEM ENABLING LOCATION ASSOCIATED MESSAGES

FIELD OF THE INVENTION

The present invention relates to a mobile communication or telephony system that enables users to deposit and read messages relating, among other things, to geographic locations.

BACKGROUND OF THE INVENTION

It is already known that mobile phones may make use of the Internet and its associated services through suitable modems. So-called WAP (Wireless Application Protocol) terminals recently put on the marketplace enable terminals of limited physical size, memory and processing power, to retrieve information accessible on the Internet in a convenient manner and also to deliver information.

The prompting of messages associated with a given location to mobile terminals passing near such locations is known in the art.

The messages are typically stored on a server, and the mobile terminal, which may contain a location determining system, such as a GPS (Global Positioning System) unit, issues signals relating to the actual location of the terminal in question, whereupon location related messages are sent to the terminal. The location determination of mobile terminals may also be performed on the basis of signals being transmitted between base-stations and mobile terminals.

The company, CitiKey™ has presented such an apparatus; a so-called mobile city guide, which may be coupled to the World Wide Web, through which information associated with the actual location of the city guide may be retrieved and exchanged.

On the CitiKey™ apparatus, the user has the possibility to see his own position on a map and he may in an interactive manner for instance search for a place to dine, book tickets to a concert, acquire the local weather forecast or find his way through the metro system.

Prior art document U.S. Pat. No. 5,699,244 shows a handheld personal digital assistant (PDA) for collecting and showing information. The device, which constitutes a miniaturised personal computer combined with a GPS unit, comprises a LCD screen whereon information can be shown and on which entries, in the form of handwritings, may be made.

The personal digital assistant according to U.S. Pat. No. 5,699,244 is adapted to collect and display data related to the actual position of the device. This information may be exchanged with the users own desktop computer through wired coupling of the personal assistant and the desktop computer. Information may moreover be exchanged with other users by coupling the desktop computer to a central server through a public network.

Prior art document EP-A-0 853 287 shows a PDA (personal digital assistant), comprising a miniaturised personal computer, a GSM interface and a GPS unit.

The above personal digital assistant is adapted to offer Internet access to the user. A certain user profile may be set up on the PDA whereby the location or travel route and accompanying information may automatically be provided as part of an Internet search session. In this way, context related messages can easily be searched and provided by specific Internet servers.

A similar system is known from WO98/59506 offering SMS (Short Message Services) messages depending on the actual location of a mobile unit as determined by a GPS unit.

SUMMARY OF THE INVENTION

The invention seeks to offer new mobile services to users enabling people to convey messages and possibly create new, useful, and perhaps unexpected contacts between people.

According to a first aspect of the invention, as claimed in claim 1, there is provided a system for the creation of graffiti or other data in a virtual space relating to the physical world.

According to a second aspect of the invention, a message is associated with the particular location on which it was created.

According to a third aspect of the invention, the message created is following the position of a particular mobile terminal, such that a dynamic message can be created.

In the case where the message is allocated to the users own mobile terminal, such dynamic messages may for instance be used in analogy to badges worn on the clothes, i.e. messages created or associated with the user.

Further advantages will appear from the following detailed description of the invention.

DETAILED DESCRIPTION OF PREFERRED EMBODIMENTS OF THE INVENTION

Figure 1:
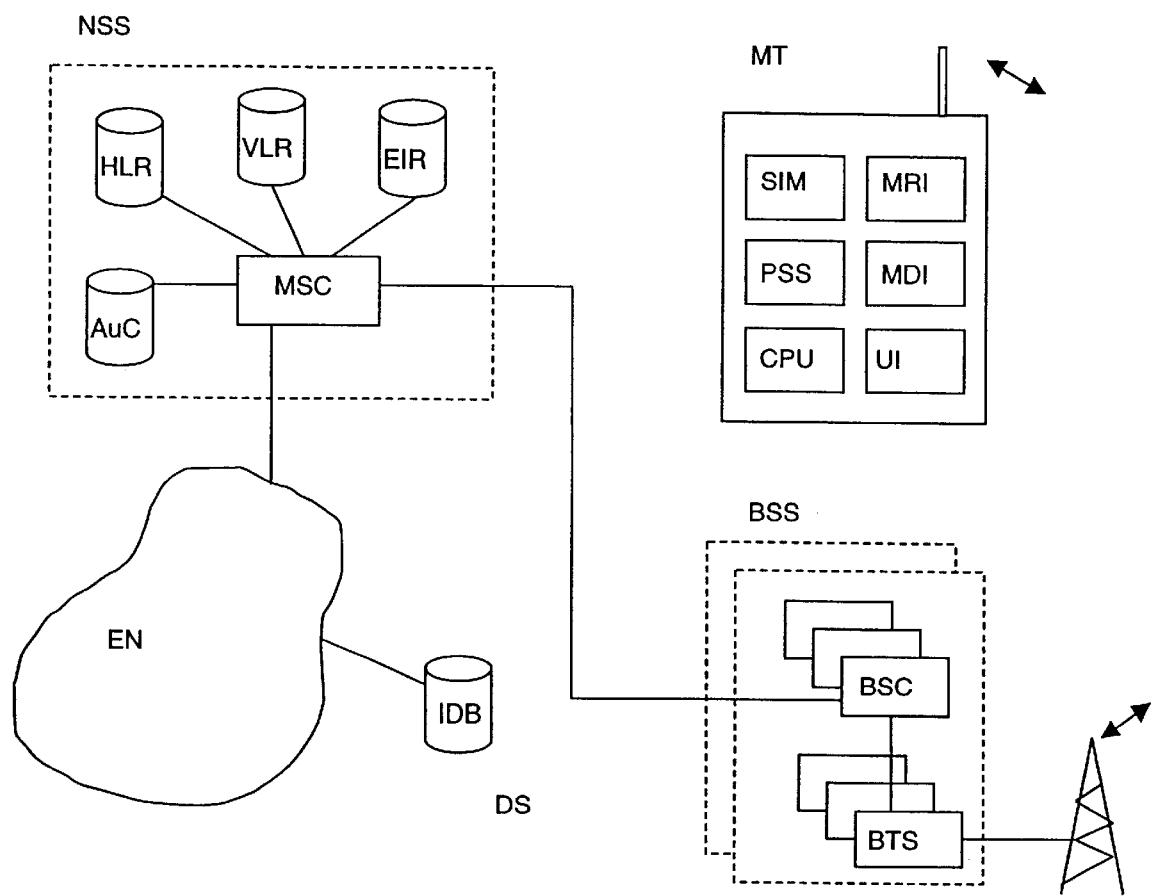
FIG. 1 is a drawing of the hardware according to a first preferred embodiment of the invention.

In FIG. 1, the mobile communication system according to the invention has been shown. The present invention may be implemented in a GSM cellular mobile phone system, but other systems such as the D-AMPS cellular system or other suitable mobile phone or wireless datacom systems can be used.

The preferred communication system shown in FIG. 1 is composed of several functional entities which can be divided into five main parts: A plurality of mobile terminals MT, of which only one is shown, a plurality of base station sub-systems BSS, a network sub-system NSS, and an external network EN.

The mobile terminal is a mobile phone or a mobile personal digital assistant adapted to be carried by an individual user. The mobile terminal MT comprises a mobile radio interface, MRI, a subscriber identity module, SIM, a user interface including for instance a keyboard, a display and an audio interface, UI, a data processing unit, CPU, and a data interface, MDI, which may be a WAP compatible GSM data interface. Such GSM data interfaces are readily available today as separate modules.

The mobile unit is adapted to send and receive data over the data interface MDI. This data may be exchanged with other application programs running on the mobile terminal MT.

The base station sub-system BSS controls the radio link with the mobile terminal MT.

The network subsystem NSS, the main part of which is the mobile services switching centre MSC, performs the switching of calls or data between mobile users MT, and other users in the network. The network subsystem NSS is arranged to switch to a Public Switched Telephone Network (PSTN), Integrated Services Digital Network (ISDN), Packet switched public Data Network (PSPDN), and Circuit Switched Public Data Network (CSPDN) etc. These networks have been illustrated on FIG. 1 by the external network EN. The external network EN could also comprise networks coupled to the Internet.

The MSC also handles the mobility management operations. Other functional blocks handle the Operations and management centre (not shown) and supervise the proper operation and set-up of the network. The mobile terminal MT and the base station sub-system BSS communicate across an air interface or radio link.

The mobile unit is uniquely identified by the international Equipment Identity (IMEI). In the subscriber identity module SIM there are stored an International Mobile Subscriber Identity (IMSI) used to identify the subscriber to the system, a secret key for authentication, and other identification. The subscriber identity module SIM may be protected against unauthorised use by a password or personal identity number etc.

The base station sub-system BSS comprises a plurality of Base transceiver stations BTS and base station controllers BSC. The base station transceiver station BTS accommodates radio transceivers that define a cell and handles the radio-link protocols with the mobile terminal MT. The base station controller BSC manages the radio resources for one or more BTS's, handles radio-channel set-up, frequency hopping and other tasks well known to the person skilled in the art.

As mentioned above, the central element in of the Network subsystem NSS is the MSC, which acts as a normal switching node and additionally provides all the functionality needed to handle the mobile subscriber through processes such as registration, authentication, location updating, handovers, call routing to a roaming subscriber, and billing. A home location register HLR and a visitor location register VLR, together with the mobile switching centre MSC, provide the call routing roaming capabilities of the cellular network.

For authentication and security purposes an equipment Identity register EIR and an Authentication centre AuC are provided, as is known from conventional GSM systems. The authentication is based on matching of secret keys found on the subscriber identity module SIM of individual mobiles MT and their corresponding copies in the authentication centre AuC.

The visitor location register VLR contains selected administrative information about those individual mobile terminals, which are currently located in the geographical area controlled by the associated mobile switching centre MSC.

A rough estimate of the momentary position of a mobile terminal can be gathered from the respective base station subsystem BSS, or visitor location register VLR, a particular mobile terminal MT is assigned to when coupled to the mobile network.

However, more exact information about individual mobiles will be needed for fulfilling the purposes of the invention.

According to the invention, the external network EN is coupled to an information database IDB on a dedicated server DS on which data messages and exact position data of mobiles and locations can be stored, updated and deleted.

The message data held on this database may be of a completely arbitrary nature and can relate to short text messages, pictures, audio files etc. According to the invention, such data is adapted to be linked to specific sets of locations or set of locations associated with individual mobile terminals.

The information database may be implemented on a single dedicated server accessible over the Internet, for instance.

The information database may also be arranged as a distributed database located on additional servers.

Exact positioning of the individual mobile terminals is accomplished by a positioning means. According to a preferred embodiment of the invention, each mobile unit is provided with a positioning subsystem PSS, such as a GPS (Global Positioning System) unit or a differential GPS unit for enhanced precision. The GPS unit is adapted to export findings of the present location of the mobile terminal to other application programs running on the mobile terminal MT. This positional information is according to the invention adapted to be further transported to the information database IDB through the mobile data interface MDI.

The positioning of the mobile terminals may alternatively be accomplished through other known methods, e.g. by means of locating signal strengths and/or delay variations in signals sent between base stations and mobile terminals. Optionally the positioning means may be incorporated in the base stations or MSC's. In the latter case the positioning means may be adapted to issue positional information to the information database.

It should be understood that the positional information on mobile terminals MT is updated at predetermined intervals such that the actual location of a mobile terminal can be resolved with a reasonable degree of precision.

According to a further aspect of the invention, the user of the mobile terminal may selectively disable the issuance of accurate positional information to or block the gathering of such information in the information database, IDB, thereby offering users, as an option, that their exact movements can not be registered.

According to a first embodiment of the invention, the mobile communication system is adapted to store user created message data in the information data base IDB in the dedicated server DS and link this message data to the geographical location or a first set of locations on which the message was created or issued to the dedicated server.

When a user decides to create a data entry, which should be linked to a specific location, he starts a session with the dedicated server DS, which prompts for message input in a number of predefined forms. This could be a text string of a certain length, or a picture or sound file of a predetermined format. The user issues the file of his choice and a first set of locations, representing for instance a specific geographical area. The location data is issued on-line together with the file to the dedicated server where it is stored in a linked fashion. The user may, according to his choice, select the actual position at which he is situated. The user's position may be provided by the built in position subsystem PSS according to a certain resolution or he may select a set of locations, which may actually not correspond to his present location.

The dedicated server may provide a number of templates, which can be retrieved from the server, subsequently easily modified on the mobile terminal and finally delivered as inputs in the information database.

Other users, or the very same user who created the given message data, may retrieve the given data by entering a search session with the dedicated server DS, whereby the user specifies a given location and a second set of locations. The second set of locations may be expressed as the area given by a maximum distance from the users actual location as determined by the respective positional subsystem, PSS. The user of the searching or inquiring mobile terminal is now ready to search for data messages in the information database for messages being linked to a set of positions falling within or overlapping the second set of locations.

Figure 2:
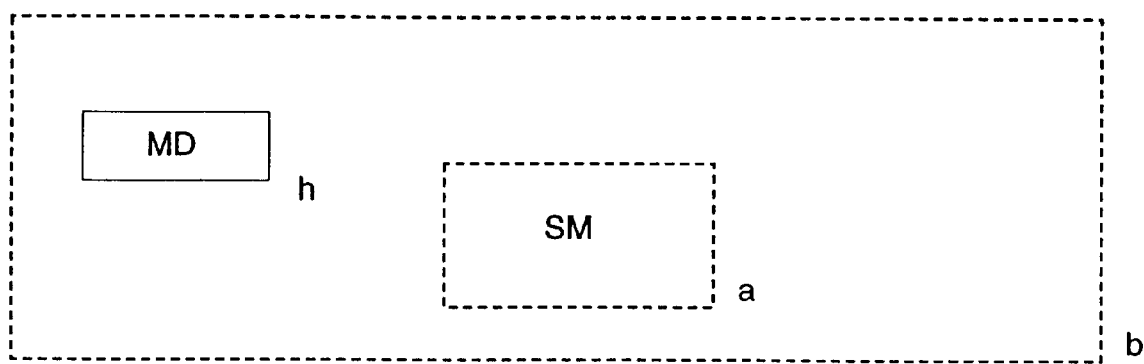
FIG. 2 is a schematic representation of one example of a message data, MD, linked to a set of first set of locations, h, and a search profile of a searching mobile, SM, defining a second, a, and third set, b, of locations.

In FIG. 2, a message data, MD, has been shown assigned to a certain geographical area defined by a first set of locations, h, while a searching mobile terminal, SM, has specified a second set of locations, a, and a third set of locations, b as part of various search profiles.

The search session may advantageously be arranged in such a way that the position of the inquiring mobile terminal is automatically forwarded to the server at predetermined intervals. In this way, the inquiring user may see all the messages, which are related to a particular geographical location, including those messages or data which were created by users of other mobile terminals in a similar fashion to how graffiti is provided in the physical world.

If numerous messages are falling within the given search parameter, the user may refine his search by using additional parameters such as using a personal phone list or any other parameter.

According to a second aspect of the invention, the data created may be assigned dynamically to the actual position of a particular mobile terminal, which position is updated at predetermined intervals.

This aspect is particular advantageous in the case where data is associated with the mobile terminal, on which the data was created. In this manner data may be "carried" on a person and follow this user while being visible to other users in the surroundings of the path of travel.

This feature is for instance advantageous on public means of transportation, such as trains and busses, where people travel together. The users of mobile terminals may in this manner address his or her particular message to the other users on the same vehicle.

In what way the present invention can be used is entirely up to the users of the mobile terminals, but it is envisaged that the invention could be used in the same manner as bulletin boards as well as the above mentioned badges are used today, thus allowing users to more conveniently address larger audiences on a location of their choice.

The operator of the dedicated server would of course have an influence on how the system is used, such as whether anonymous messages should allowed and whether a degree of censorship would be preferable. For instance, it is envisaged that the dedicated server could be adapted to filter out messages according to a profile involving parameters such as time, location, and total amount of messages and content.

The present invention is well suited as a means of presenting commercials. For this reason, the dedicated server may provide users, against payment, the exclusive right to assign messages to certain sets of locations or areas.

A tariff system could also be implemented for locations not being exclusive to one single user, but to a plurality of users. A certain amount of messages or certain amount of linked sets of locations or area measures could be subject to a payment. The tariff system could be rated selectively to different categories of users such as consumers and professionals.

Another application is to use the dynamic messages following a particular mobile as a means of authenticating users in a particular geographical area.

A monitoring agent could provide, against payment, an arbitrary code, which is assigned to the individual mobile terminal and the associated telephone number or other identification code. The user of a mobile terminal can by displaying his assigned code and his telephone number at a predetermined place and time, such as at a toll station, provide proof of payment.

The user may search for messages according to a certain search profile, which may narrow the search results. The search profile may involve selection of the area he is interested in, as represented by a given radius from his present location for instance or a predetermined area. The user may furthermore search for messages, which were created by particular persons, such as persons appearing on the users contact list. Moreover, he may make the search result appear as a function of a particular time interval within which the given messages were created. Other search criteria's could also be used to refine the search.

It should be understood that optionally messages could be read and created on stationary devices, such as PC's coupled to the fixed network. The user simply selects an area he is interested in or selects a search profile according to his choice and performs entries into the information database or read from the database.

In conclusion, a number of new possibilities for communication have been accomplished according to the invention.

REFERENCE SIGNS

MS mobile communication system
MT mobile terminal
SIM subscriber identity module
PSS positioning sub-system
MRI mobile radio interface
MDI mobile data interface
UI user interface
CPU processing unit
BSS base station sub-system
BSC base station controller
BTS base station transceiver
NSS network sub-system
MSC mobile switching centre
VLR visitor location register
HLR home location register
EIR equipment identity register
AuC authentication centre
EN external network
DS dedicated server
IDB information database

What is claimed is:

1. Mobile communication system (MS) comprising
   a plurality of mobile terminals (MT), a plurality of base-station subsystems (BSS) for communicating wirelessly with the mobile terminal, each base station subsystem being adapted for communicating with a network subsystem (NSS), comprising a switching centre (MSC), the mobile switching centre (MSC) being adapted for communicating with other mobile switching centres and with a dedicated server (DS) over the network, the mobile communication system comprises
   position means (PPS) for locating the geographical position of individual mobile terminals,
   the dedicated server being adapted to store message data in an information database (IDB) and link said message data to a first set of locations,
   the dedicated server (DS) being adapted to engage in on-line search sessions with individual searching mobile terminals for forwarding stored message data to such searching mobile terminals upon request and in accordance with a user specified search profile, in which a second set of locations are defined, whereby data messages linked to the first set of locations overlapping or falling within the second set of locations will be presented to the searching mobile and whereby at least one of the first and second set of locations is associated with the actual position of a mobile terminal as given by the position means (PSS), and whereby the message data is adapted to be created on a mobile terminal (MT) and issued to the dedicated server on-line.

2. Mobile communication system according to claim 1, wherein the stored message data is linked to the set of locations at which the message data was created or issued to the server.

3. Mobile communication system according to claim 1, wherein the stored message data is linked to the set of locations following the position of the mobile terminal on which the message was created or issued to the server.

4. Mobile communication system according to claim 1, wherein the search profile additionally involves that persons according to a predetermined list created by the user is used as a search parameter.

5. Mobile communication system according to claim 4, wherein the search profile is associated with the identification codes of terminals on a specified list comprising a personal list of the user of the terminal in question.

6. Mobile communication system according to claim 4, wherein the search profile is associated with a specified time interval.

7. Mobile communication system according to claim 1, wherein the terminal is adapted selectively to hide the exact position of the terminal from the dedicated server or prevent data being indicative of the exact position of the terminal from being visible in the information database in the dedicated server.

8. Mobile communication system according to claim 1, wherein the server is adapted to filter out messages from an individual user according to a certain profile, involving parameters comprising time, location, total amount of messages and content.

9. Mobile communication system according to claim 1, in which the data size and the amount of message linked locations linked to messages are subject to a tariff system.

10. Mobile communication system according to claim 1, in which a user may obtain the exclusive right to assign messages to a particular set of locations existing on the dedicated server.

* * * * *